Sept. 25, 1934.  A. H. MOECKER  1,974,830
RACK OR SLIDE FOR COOKING STOVES OR THE LIKE
Filed July 15, 1932
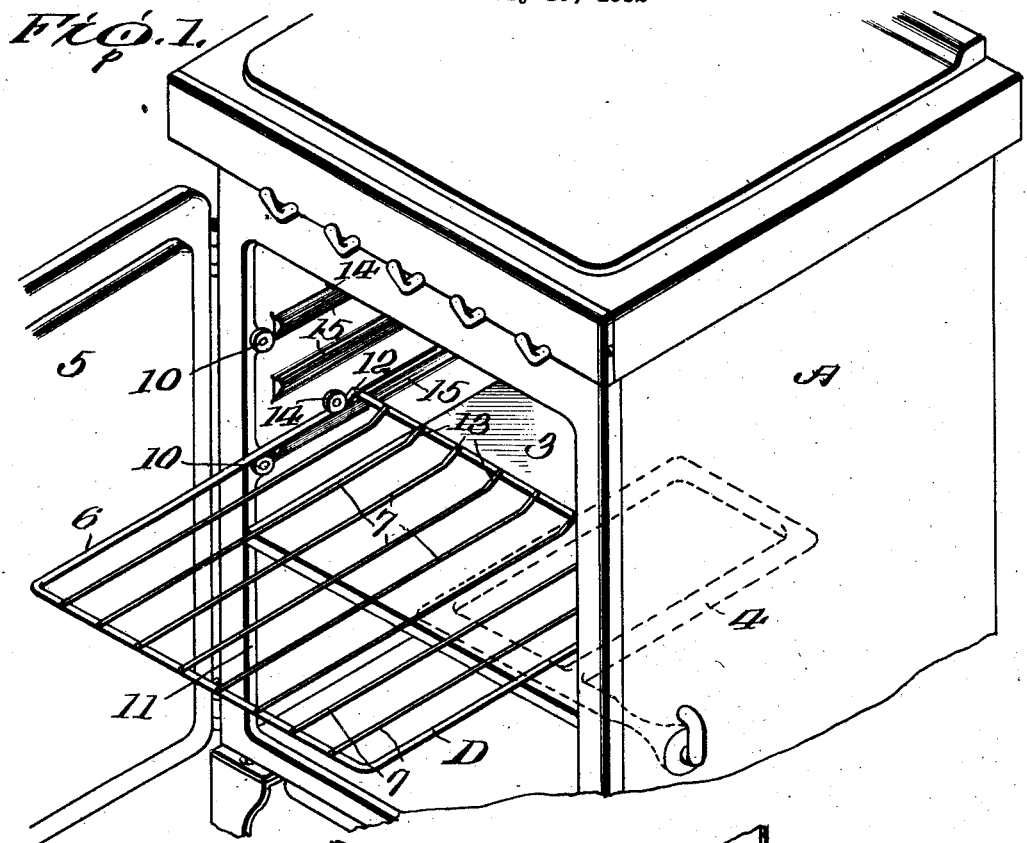
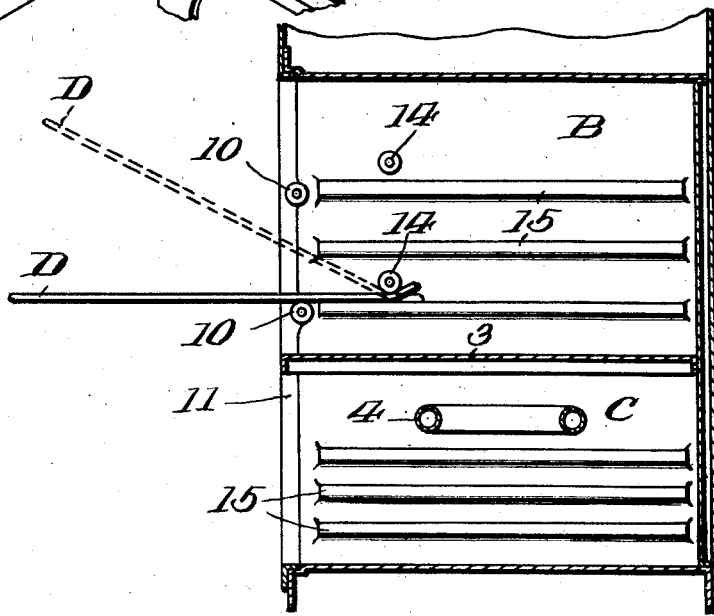
Inventor
A. H. Moecker
By Pattison, Wright & Pattison
Attorneys Patented Sept. 25, 1934

1,974,830

UNITED STATES PATENT OFFICE 1,974,830

RACK OR SLIDE FOR COOKING STOVES OR THE LIKE

Arnold H. Moecker, Homewood, Ill., assignor to American Stove Company, St. Louis, Mo., a corporation of New Jersey Application July 15, 1932, Serial No. 622,763

2 Claims. (Cl. 126—339)

This invention relates to improvements in racks or slides for cooking stoves or the like, and pertains more particularly to a wire rack or slide intended to be used in the cooking or broiling ovens of cooking stoves or ranges.

The primary object of the invention is the provision of an improved sliding rack or shelf.

A further object of the invention is the provision of an improved sliding rack or shelf for use in connection with cooking stoves and so constructed as to prevent the accidental removal of the rack or shelf from the cooking compartments of the stove.

Another and further object of the invention is the provision of an improved food utensil support for use in connection with cooking ranges which is of a novel and improved construction yet extremely cheap and simple of manufacture.

Other specific objects, novel features of construction and improved results of the invention will appear in more detail from the following description read in the light of the accompanying drawing.

In the drawing:

Figure 1 is a view in front elevation of a cooking stove illustrating the application of my improved invention thereto.

Fig. 2 is a vertical sectional view of the stove and structure illustrated in Fig. 1.

To those familiar with the use and operation of cooking stoves or ranges the danger of a complete accidental removal of the shelves or racks from the baking and broiling ovens of a gas range when said racks are pulled outwardly for inspection of the food being cooked, or for the purpose of basting when meats are being cooked, is well-known. It is also recognized that should the rack be completely removed from the stove under these conditions or should the rack be so far removed as to tilt downwardly there is great danger of injury from the spilling of hot grease, food or utensils which would slide or fall from the rack upon the person making the inspection.

The present invention has been conceived to eliminate the above enumerated objections which are present in respect to racks as now constructed and used in cooking stoves and to eliminate the possibility of injury to the cook or user of the stove by preventing accidental removal of the rack from the stove and by preventing any tipping of the rack when the same is pulled forward and outward from the stove as is the practice for inspection of foods being cooked.

Referring now to the drawing, A represents a gas stove which may be of any conventional or well-known construction. In the present illustration used for the purpose of giving a clear understanding of the present improved invention, the stove is represented as having a baking oven B and broiling oven C in superposed relation. A plate 3 constitutes the division between the two ovens. Both of the ovens are heated or fired by a gas burner 4, positioned adjacent the top of the broiling oven. Both of the ovens at their fronts are provided with a front door 5, although it is to be understood that an individual door for each oven could be provided were it desirable.

The oven rack, shelf or slide is designated at D, and for the purpose of cheapening the construction and also for the reason that it has been found to be the most desirable type this rack is a wire rack made up of a frame 6, across which extends a plurality of wires or rods 7, arranged in separated parallel relation.

The rear end of the rack frame 6 is bent upwardly as at 12, and similarly all of the rods or wires 7 of the rack are bent upwardly as at 13 to form at the rear end of the rack an upturned edge.

The oven side walls or lining are provided with elongated bulges or ribs 15, which are arranged in separated parallel relation and in addition to strengthening the lining or walls they form a means for the support of the rack and upon them the rack can be slid into and out of the oven.

As a means for supporting the front ends of the rack there is provided a pair of rollers 10, one each arranged at the opposite sides of the oven opening and being rotatably supported upon the inwardly turned edges 11 of the stove front.

As a means of preventing the rack from tipping when it is pulled upwardly from the oven and as a means for preventing an accidental complete removal of the rack from the oven, there is provided at each side of the oven a stop roller 14. The stop rollers are positioned slightly inside of the opening to the oven and upon the oven side walls and are adapted to engage the upper faces of the side rods of the rack frame 6.

As will be clearly evident from Fig. 1 of the drawing, the rack cannot be completely pulled from the oven as the upwardly turned rear edge of the rack will engage the rollers 14, which will act as a stop to any further outward movement of the rack.

The stop 14 is so positioned that the rack can be sufficiently withdrawn from the stove for convenient and easy observation of the food being cooked or to permit basting in respect to meats or to bring the utensil positioned on the rack sufficiently far forward to permit of convenient removal of the utensils or the contents thereof.

It is to be understood that the rear upturned edge of the rack can be made to assume any desired angle, curve or radius and that the stops 14 could be of various designs or structures and still fall within the present inventive concept.

It will be obvious that it might be desirable to shift the position of the rack in the oven in the event only one rack for the oven is furnished. To this end there are illustrated two sets of rollers 10 and rollers 14. Figure 2 of the drawing illustrates the manner in which the rack can be removed from the oven. It will be at once apparent that this is accomplished by raising the forward or front end of the rack which permits the rear upwardly turned end of the rack to pass under the stop rollers 14.

Although the broiling oven is not illustrated as being provided with the rollers 10 and 14, it will be obvious that the broiling oven could be fitted for the use of the present improved rack and it will also be at once apparent that a shelf, rack or slide built in accordance with the present inventive concept could be used in cabinets, book-cases or other structures of a similar nature without departing from the spirit of the present invention.

It is to be borne in mind that although rollers are illustrated for supporting the front ends of the rack and that rollers are illustrated as constituting the means for preventing the tipping of the rack and its accidental removal, that other means could be utilized in place of the rollers without departing from the spirit of the present invention.

Having thus described my invention what I claim and desire to secure by Letters Patent is:

1. In a stove, an oven compartment having on its inner side walls rack supporting means, a door opening for said oven compartment having a surrounding frame, stop members positioned on the inner side walls of said oven adjacent the front end of said compartment and immediately above the rack suporting means, rack supports on said door opening frame and in alignment with the rack supporting means within the oven, a rack slidable upon said rack supporting means and having its rear end bent upwardly at an acute angle throughout the width of the rack and adapted to engage the stops above the rack support, said rack when pulled outwardly from said oven being supported against tilting between the stops and the supports on the door opening frame and against complete removal from the oven by reason of the engagement of the upturned rear end of the rack with the stops, and the upturned rear end of the rack preventing slippage of utensils rearwardly over the rear end of the rack during the outward movement of the rack.

2. In a stove, an oven compartment having on its side walls oppositely disposed longitudinally extending ribs serving as rack supporting means, a door opening for said oven compartment and provided with an inwardly extending flange, stop members positioned on the inner side walls of said oven adjacent the front end of said compartment and immediately above the rack supporting ribs, rack supporting rollers positioned on the inturned flange of said door opening member and in alignment with said rack supporting ribs, a rack slidable upon said rack supporting ribs and having its rear end bent upwardly at acute angle throughout the width of the rack and adapted to engage the stops which are positioned above the rack supporting ribs, said rack when pulled outwardly from said oven being supported against tilting between the stops and the rack supporting rollers on the door frame and against complete removal from the oven by reason of the engagement of the upturned rear end of the rack with the stops, and the upturned rear end of the rack preventing slippage of utensils rearwardly over the rear end of the rack during the movement of the rack.

ARNOLD H. MOECKER.